D. NICHOLS.
Corn-Planter.
No. 26,700.
Patented Jan. 3, 1860.
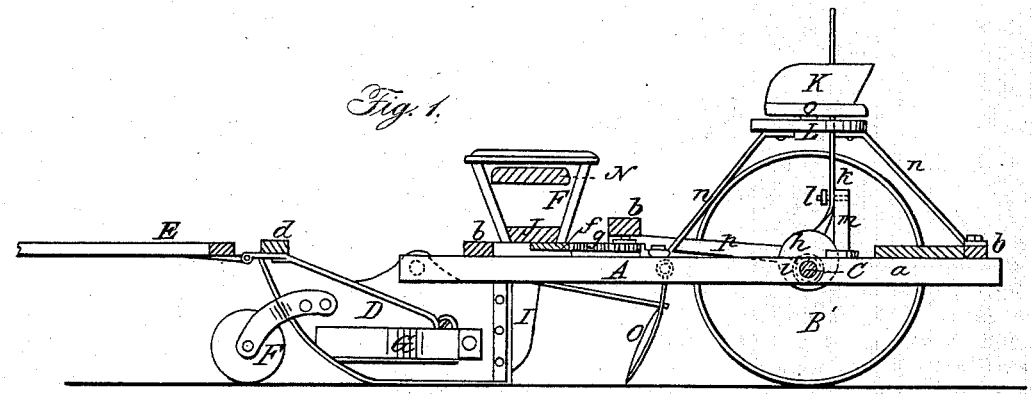
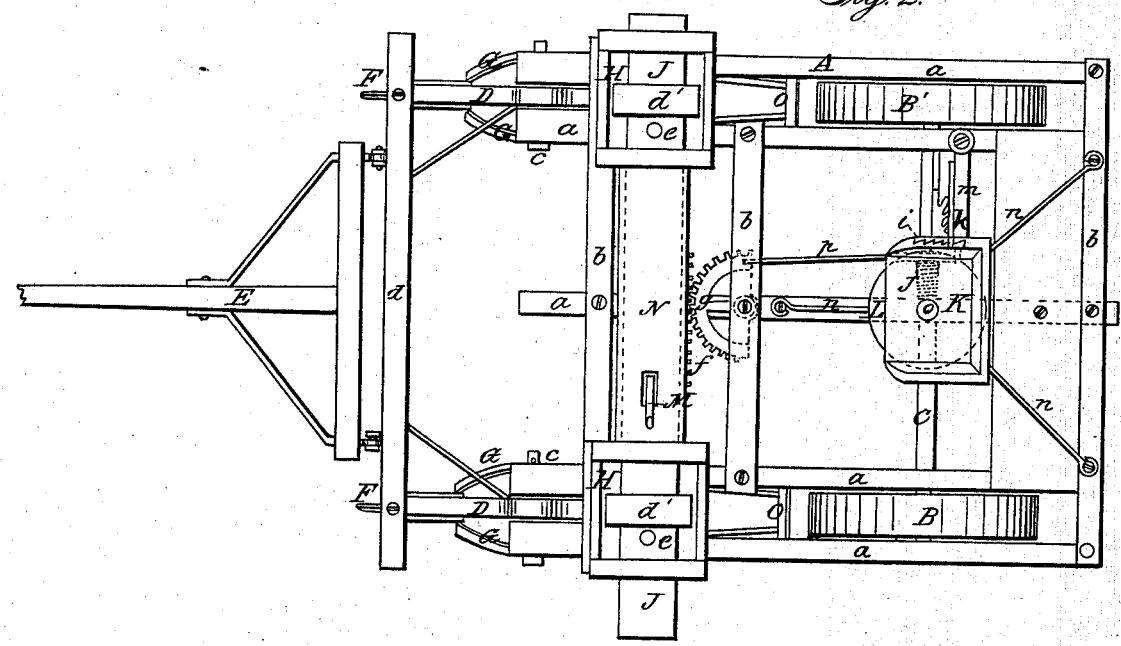
Witnesses:
Lyman Pike
George W. Binford
Inventor:
Darrill Nichols

UNITED STATES PATENT OFFICE.

DANIEL NICHOLS, OF ONARGA, ILLINOIS.

IMPROVEMENT IN CORN-PLANTERS.

Specification forming part of Letters Patent No. 26,700, dated January 3, 1860.

*To all whom it may concern:*

Be it known that I, DANIEL NICHOLS, of Onarga, in the county of Iroquois and State of Illinois, have invented a new and Improved Corn-Planter; and I do hereby declare that the following is a full, clear, and exact description of the same, reference being had to the accompanying drawings, making a part of this specification, in which—

Figure 1 represents a longitudinal vertical section of my invention. Fig. 2 is a plan or top view of the same.

Similar letters of reference in both views indicate corresponding parts.

In planting corn, particularly when it is to be done in new ground, the furrows are many times obstructed by sod or other large lumps, and if the corn drops on them or near to them it does not grow, as in the first case it has no proper ground, and in the second case it is not sufficiently covered. For this reason I have attached to the runners which draw the furrows rolling cutters, which pass along before said runners where the seed is to drop, and guards are attached to the sides of the runners, which turn the sod or any other obstruction that might interfere with the covering of the corn out of the way. The corn drops behind the runners, and as it falls it is protected from being blown off by the wind by metal strips that are attached to the rear end of the runners, which also serve to open the trench wider for receiving the corn. The runners in my machine are hinged to the frame, so that they adapt themselves more readily to unevenness of ground or to other obstructions over which the machine has to pass, the team being hitched to the fore part of the runners, and the whole frame being so arranged that a man, by stepping on the back part of the same, can raise the runners from the ground and prevent the machine catching. The seed-slide is operated by a toothed rack gearing into a toothed sector, to which a vibrating motion is imparted from an eccentric on the driving-axle, and said eccentric is so arranged that it turns with the said axle and imparts motion to the seed-slide when a clutch attached to it is brought in gear with a corresponding clutch that is firmly secured to the axle; or said eccentric remains stationary if pushed from said clutch on the axle. By this arrangement the dropping of the seed depends entirely upon the speed of the team, and it can be discontinued at any moment. The driver's seat is arranged right over the axle, and in such a manner that it revolves on a vertical pivot, enabling the driver to face in whatever direction he pleases.

To enable those skilled in the art to make and use my invention, I will proceed to describe it.

A represents a square frame, constructed of longitudinal timbers $a$ and transverse timbers $b$, and supported in the rear by wheels B B' and in front by runners D. The wheels are placed on the driving-axle C, the wheel B being loose, and the wheel B' being rigidly attached to the same.

The runners are secured to the front ends of the longitudinal timbers $a$ of the frame by means of pivots $c$, and they are connected by a cross-bar, $d$, to which the draft-pole E is attached. Secured to the front end of said runners and right before their centers are the rolling cutters F, which serve to clear the track and to cut up large lumps of ground before the runners begin to operate, and guards G are attached to the sides of said runners, which serve to turn sod or other large lumps out of the way, so that the same do not interfere with the growth of the corn. Said runners extend nearly to the middle of the hoppers H, from which the corn drops down into the furrow or trench opened by the runners. Metal strips I are secured to the rear end of the runners, so as to protect the corn against the influence of the wind. These strips are bent out so that they also serve to open the trench wider for receiving the corn.

The corn from the hoppers is discharged by means of a slide, J, which extends through both hoppers and under partitions $d'$, the under edges of which are furnished with brushes to brush off the surplus seed from the seed-cells $c$. A reciprocating motion is imparted to the seed-slide by means of a toothed rack, $f$, which is attached to said seed-slide, and which gears into a toothed sector, $g$, to which an oscillating motion is given by means of an eccentric, $h$, on the driving-axle. This eccentric is placed loosely on said axle, and one part, $i'$, of a clutch-coupling is attached to it, which meshes into a similar clutch, $i$, that is firmly keyed to the driving-axle. A spring, $j$, serves to force the eccentric toward the clutch $i$, so that it turns with the driving-axle, causing the seed-slide to discharge seed as the wheel B' rotates. A forked lever, $k$, which has its fulcrum on a pivot, $l$, attached to a pendant, $m$, serves to throw the eccentric $h$ out of gear with the clutch $i$, whereby the seed-slide is rendered stationary.

The lever $k$ is operated from the driver's seat K, that is mounted on a platform, L, which is supported by three standards, $n$, and said seat turns on a pivot, $o$, so that the driver is enabled to face whatever way he pleases.

When it is desired to drop the corn by hand, the rod $p$, which connects the eccentric $h$ with the toothed sector $g$, is unhooked, and the seed-slide is operated by a hand-lever, M, which extends through a seat, N, that is firmly secured between the two hoppers. After the seed has thus been deposited on the ground it is covered over by the double convex shovel-plows $o$, which are arranged behind the hoppers so as to turn the dirt in on the trench where the corn has been dropped, and over the covered corn pass the wheels B B', which for this purpose are arranged with wide faces or rims placed directly on a line with the point where the corn drops from the hoppers, so that they press down the dirt and render the planting complete.

What I claim as new, and desire to secure by Letters Patent, is—

The arrangement of the rolling cutters F, guards G, and metal strips I, in combination with the runners D, which are hinged to the frame A, substantially in the manner and for the purpose specified.

DANIEL NICHOLS.

Witnesses:
　LYMAN PIKE,
　GEORGE W. BINFORD.